March 17, 1925.
H. C. ELLIS
PIPE CONNECTION
Filed March 23, 1921
1,529,994
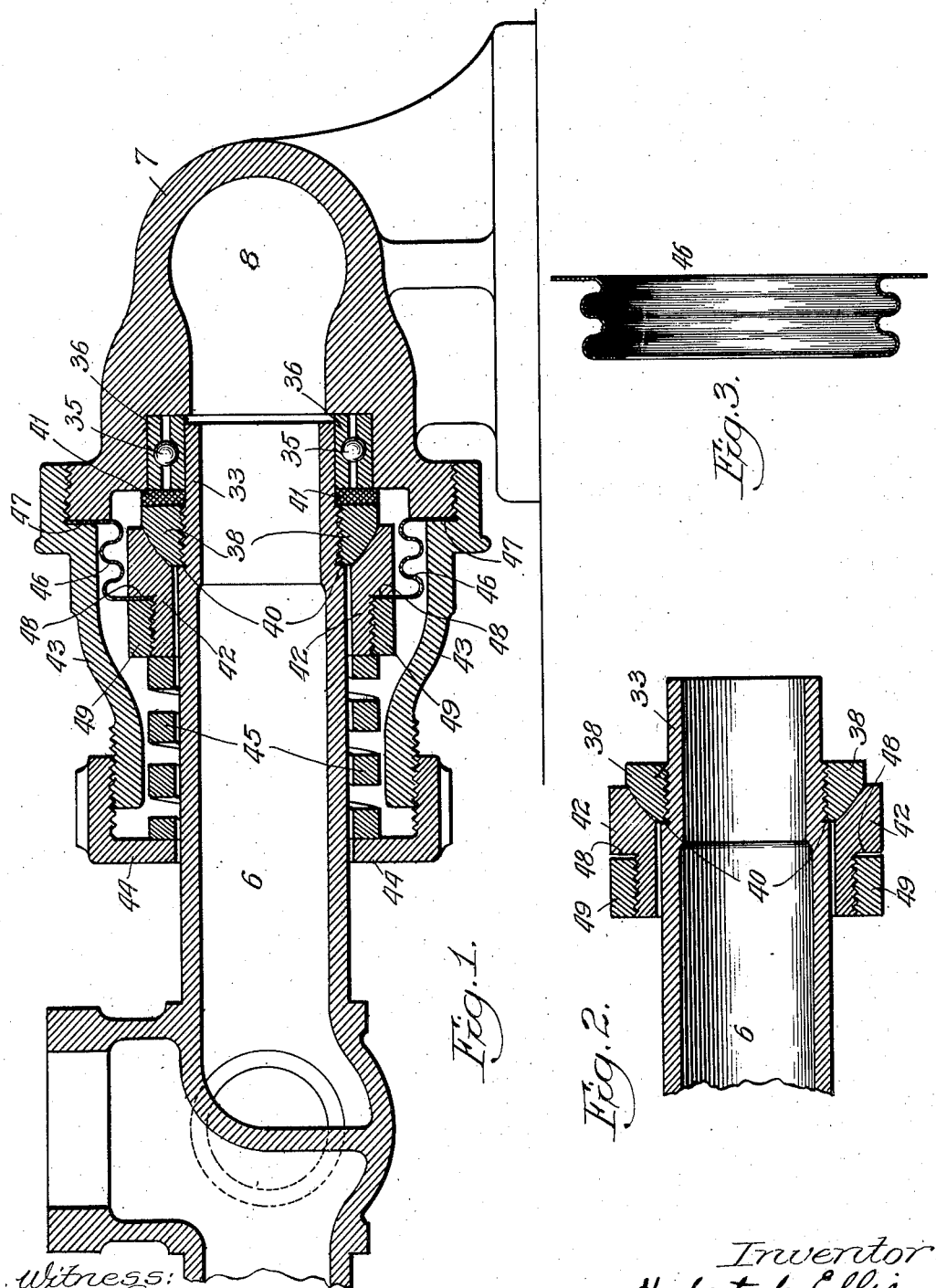
Inventor:
Hubert C. Ellis
by Fred Gerlach
his Atty.

Patented Mar. 17, 1925.

1,529,994

UNITED STATES PATENT OFFICE.

HUBERT C. ELLIS, OF EVANSTON, ILLINOIS, ASSIGNOR TO ELLIS DRIER & ELEVATOR COMPANY, OF CHICAGO, ILLINOIS, A CORPORATION OF WISCONSIN.

PIPE CONNECTION.

Application filed March 23, 1921. Serial No. 454,824.

*To all whom it may concern:*

Be it known that I, HUBERT C. ELLIS, a subject of the King of Great Britain, and a resident of Evanston, in the county of Cook and State of Illinois, have invented certain new and useful Improvements in Pipe Connections, of which the following is a full, clear, and exact description.

The invention relates to pipe-connections of the type used for supporting a pipe which is adapted for conducting fluids under pressure, so as to permit relative rotation of the pipe and the fitting from which it receives, or to which it delivers, the fluid.

The object of the invention is to provide an improved connection between the pipe and the fitting which prevents leakage, which permits expansion and contraction of the parts resulting from temperature changes, and which automatically takes up any wear.

The invention consists in the several novel features hereinafter set forth and more particularly defined by claims at the conclusion hereof.

In the drawings: Fig. 1 is a section of a connection embodying the invention. Fig. 2 is a detail of pipe and bearing ring thereon. Fig. 3 is a detail of the diaphragm between the fitting and the bearing-ring caused thereby.

The invention is exemplified as applied to a stationary fitting 7 having a duct or chamber 8 therein for the fluid to or from a trunnion-pipe 6 which is rotatable relatively to the fitting.

The end 33 of the trunnion pipe is supported by anti-friction balls 35 which run in the adjacent fitting and are held in a suitable retainer 36. Clearance is left between the end of the trunnion-pipe and the fitting to permit longitudinal expansion and contraction of the pipe. A bearing-ring 38 is screw-threaded to the trunnion pipe inwardly of the anti-friction bearing and forced tightly against a shoulder 40 so fluid cannot leak between the ring and the pipe. A packing ring 41 is disposed between the outer end of bearing-ring 38 and the adjacent fitting and this packing is lubricated with graphite or other suitable lubricant. A stationary bearing ring 42 bears against the inner face of ring 38; the contacting faces of said rings being ground to form a tight-joint and may, if desired, be tapering as shown. Packing ring 41 measurably prevents the escape of fluid from the anti-friction bearing in said joint. A sleeve 43 is screw-threaded to the inner end of the adjacent stationary fitting and a flanged collar 44 is screw-threaded to the inner end of said sleeve to house the joint. A coil-spring 45 is interposed between the collar 44 and the stationary bearing-ring 42 to hold the coacting bearing rings 38, 42 in snug contact. The force of the spring may be varied by adjusting the collar 44. A metallic diaphragm 46 has its outer margin clamped between the stationary fitting and a shoulder 47 on the sleeve 43 and its inner margin is clamped between a shoulder 48 on the bearing-ring 42 and a collar 49 which is screw-threaded to said ring. This diaphragm is corrugated so that it will permit the non-rotatable bearing-ring to follow the trunnion-pipe as the latter contracts or expands and prevents any leakage of fluid between the non-rotatable ring and the fitting.

In operation, the spring holds the bearing-rings in close contact. The diaphragm makes it possible for both rings to remain in contact notwithstanding any expansion or contraction of the parts resulting from temperature changes. The pipe will always be rotatable relatively to the fitting without unnecessary friction, and leakage is effectively prevented.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a fitting and a pipe, one of which is rotatable relatively to the other, of a connection between them comprising rings having fluid-tight contact, one of which is fixed on one of said parts, a diaphragm fixed to the other ring and to the other of said parts, which permits the latter ring to move longitudinally to maintain the contact between the rings when displacement is caused by the expansion and contraction of the parts, and positive supporting means for the pipe and the fitting whereby they will both be constantly supported, independently of the diaphragm, against radial movement, the pipe and fitting being free to permit longitudinal expansion and contraction while thus supported.

2. The combination with a fitting and a pipe, one of which is rotatable relatively to the other, of a connection between them comprising rings having fluid-tight contact, one of which is fixed on one of said parts, means to force said rings into contact, a diaphragm fixed to the other ring and to the other of said parts, which permits the latter ring to move longitudinally to maintain the contact between the rings when displacement is caused by the expansion and contraction of the parts, and positive supporting means for the pipe and the fitting whereby they will both be constantly supported, independently of the diaphragm, against radial movement, the pipe and fitting being free to permit longitudinal expansion and contraction while thus supported.

3. The combination with a fitting and a pipe, rotatable therein, of a connection between them comprising rings having fluid-tight contact, one of which is fixed on one of said parts, means to force said rings into contact, a diaphragm fixed to the other ring and to the other of said parts, which permits the latter ring to move longitudinally to maintain the contact between the rings when displacement is caused by the expansion and contraction of the parts, a fixed support for the fitting and a bearing for the pipe by which the pipe will be constantly supported, independently of the diaphragm, against radial movement, the pipe and fitting being free to permit longitudinal expansion and contraction while thus supported.

4. The combination with a fitting and a pipe rotatable therein, of a connection therebetween comprising rings having fluid-tight contact, one of which is fixed on the pipe, means to force the rings into contact, a diaphragm fixed to the other ring and to the fitting, which permits the latter ring to follow the ring on the pipe when displacement results from expansion and contraction of the pipe, means to fixedly support the fitting, and a bearing for the pipe, whereby the pipe will be rotatably supported independently of the diaphragm against radial movement, and the pipe being free to expand and contract longitudinally while thus supported in the bearing.

5. The combination with a fitting and a pipe rotatable therein, of a connection therebetween comprising rings having fluid-tight contact, one of which is fixed on the pipe, means to force the rings into contact, a diaphragm fixed to the other ring and to the fitting, which permits the latter ring to follow the ring on the pipe when displacement results from expansion and contraction of the pipe, means to fixedly support the fitting and a pipe-bearing in the fitting, whereby the pipe will be rotatably supported independently of the diaphragm against radial movement and the pipe being free to expand and contract longitudinally while thus supported in its bearing.

6. The combination with a fitting and a pipe rotatable therein, of a connection therebetween comprising rings having fluid-tight contact, one of which is fixed on the pipe, a spring enclosed in the fitting for forcing the rings into contact, a diaphragm fixed to the other ring and to the fitting, which permits the latter ring to follow the ring on the pipe when displacement results from expansion and contraction of the pipe, means to fixedly support the fitting, and a pipe-bearing in the fitting whereby the pipe will be rotatably supported independently of the diaphragm against radial movement and the pipe being free to expand and contract longitudinally while thus supported in its bearing.

HUBERT C. ELLIS.